P. EISENBACH.
SPRING WHEEL.
APPLICATION FILED NOV. 8, 1920.
1,411,329. Patented Apr. 4, 1922.
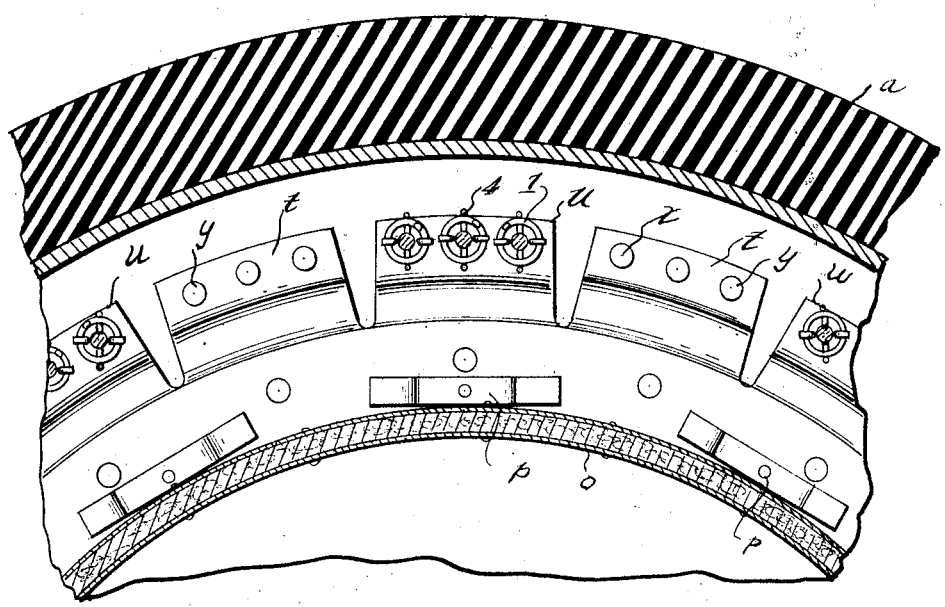
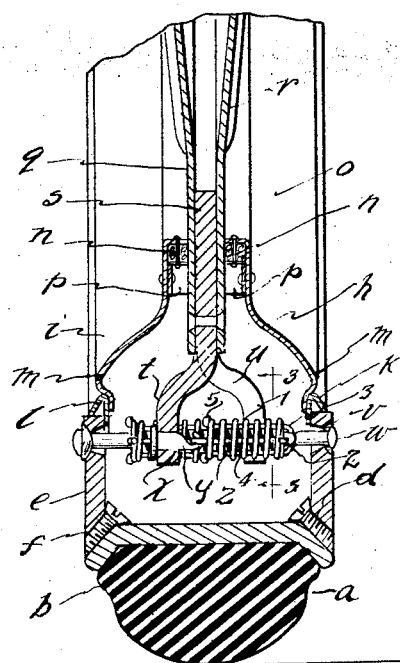
INVENTOR.
Peter Eisenbach
BY
Stuart C Barnes
ATTORNEY.

UNITED STATES PATENT OFFICE.

PETER EISENBACH, OF DETROIT, MICHIGAN.

SPRING WHEEL.

1,411,329.

Specification of Letters Patent.

Patented Apr. 4, 1922.

Application filed November 8, 1920. Serial No. 422,699.

*To all whom it may concern:*

Be it known that I, PETER EISENBACH, a citizen of the United States, residing at Detroit, in the county of Wayne and State of Michigan, have invented certain new and useful Improvements in Spring Wheels, of which the following is a specification.

This invention relates to spring wheels, and has for its object a spring wheel made up of an outer and inner wheel part having a limited relative movement opposed by coil springs normally set perpendicularly to the wheel plane. Any movement of one wheel part with respect to the other wheel part is opposed by a compression of these springs, as will be more fully explained hereinafter. Springs of this general class are not broadly new, but it is thought the arrangement of the springs and parts is new. The parts are so arranged that springs of maximum length can be utilized so as to distribute the strains over a large number of coils of the spring and hence not to unduly strain the spring having a given coil strength.

The wheel also involves improvements in the construction of the chamber that houses the spring elements, as will be better explained when the detail is understood.

In the drawings,—

Fig. 1 is a fragmentary section of a portion of the wheel taken in the plane of the wheel.

Fig. 2 is a fragmentary cross section of the wheel.

Fig. 3 is a section taken on the line 3—3 of Fig. 2.

The wheel, like a great many wheels of this nature, is made up of outer and inner wheel sections. $a$ designates a solid rubber tire which is secured upon the rim $b$. A pair of side rings $d$ and $e$ are adapted to fit into the sides of the rim and are keyed thereto by stove bolts $f$ screwed down through tapped sockets half in the rim and half in the ring. The rings are not only held in place by these cap screws or keys but also by the spring attachment to the inner wheel section presently to be described. The side wings $e$ and $d$ in connection with the rim and in connection with the flexible rings $h$ and $i$ and the lockng rings $k$ and $l$ form the annular spring chamber. The flexible rings $h$ and $i$ are made out of flexible sheet metal and are locked in place by crowding the locking rings $l$ and $k$ in between the shoulders $m$ and the inside of the side rings $d$ and $e$. These locking rings are of substantially V cross section with a longer leg on the inside of the V than on the outside. They are made of spring metal and consequently the same is distortable to crowd the locking ring into place or pull it out. When the locking ring has been crowded in under the shoulders $m$ it will be seen that the long leg of the V engages on the inside of the side rings $d$ and $e$ so as to prevent the locking rings from coming out without prying. This, therefore, locks the flexible rings $i$ and $h$ in place and crowds the packing $n$ supported on the turned-in flanges $o$ of these rings up against the inner wheel section. Riveted to the inside of the flexible rings $i$ and $h$ are flat springs $p$ which press the flexible rings out slightly so as to avoid too great pressure of the packing against the inner wheel section due to the jamming of the locking rings $k$ and $l$ in under the shoulders $m$ of the flexible rings.

The inner wheel section is here shown as made up of a pair of pressed disks $q$ and $r$ between which is riveted a heavier metal ring $s$. A single metal disk could be used in place of the three members $q$, $r$ and $s$ or the heavy ring $s$ could be completely done away with and the two disks used for the ring or web without changing the principle of the invention. Hence these members that go to make up the inner wheel section will be given a broad significance as the web construction. The ring $s$ has its outer peripheral portion struck out alternately from one side to the other, as is clearly shown in Fig. 2, forming the spring-carrying lugs $t$ and $u$, the ones struck out to one side being designated $t$ and the ones being struck out to the other side being designated $u$. This obviously permits the use of a very much longer spring than would be possible if the spring-carrying portions were in the center. Each one of these spring-carrying lugs is adapted to carry three springs but obviously the number could be varied and could also be two or more rows deep. The side rings $d$ and $e$ are bored and countersunk at $v$ to receive the headed hooks $w$, while the spring-carrying lugs $t$ and $u$ are also each bored at $x$ to receive the headed hooks $y$. The hooks $y$ hook into a wire yoke $z$. The legs of this yoke run up on the inside of the coil spring 1 and are turned over at 2 to hook over the end coil of the spring. Similarly each of the hooks *w* hooks into a wire yoke 3 having legs 4 extending up through the center of the coil and having turned-over ends 5 that hook onto the opposite end coil of the spring. These coil springs 1 are compressed when the two yokes are hooked in so that they are under initial compression to take up any wear and always be strung tight. These yokes are a quite common device for attaching two members that have relative movement to the remote ends of coiled springs so as to change the strain on the spring from a tractile strain to a compression strain. Compression springs are more reliable than pull springs as they are not so liable to become permanently set by distortion and not so liable to become weakened. By reason of offsetting the spring-carrying lugs, as described, obviously a very much longer compression spring may be utilized and obviously the strain distributed over a great number of coils thereby enabling the springs to stand up better.

The spring-containing chamber which is defined by the side rings *e* and *d* and the flexible rings *h* and *i* and locking rings *l* and *k* also acts as a lubricant container. It may be partially packed with a lubricant to lubricate the sliding parts and render the same free from friction and noiseless. The packing *n* avoids loss of this lubricant. These flexible rings *h* and *i* and locking rings *l* and *k* can easily be removed to apply fresh lubricant.

What I claim is:

1. In a spring wheel, the combination of outer and inner wheel sections slidably engaged, the inner wheel section provided with a web construction having lugs alternately offset in opposite directions from the central plane of the webbing, and coil springs connecting these lugs with the outer wheel section at the remote sides.

2. In a spring wheel, the combination of outer and inner wheel sections slidably engaged, the inner wheel section provided with a web construction having spring-carrying lugs alternately offset in opposite sides of the web construction, coil springs connecting these lugs to the remote sides of the outer wheel section, said springs being located in substantially perpendicular position with respect to the wheel plane when the sections are concentric, and means for converting the stresses brought about by an eccentric relation of the sections into compression stresses upon the coil springs.

3. In a spring wheel, the combination of outer and inner wheel sections slidably arranged, the inner section being provided with a web construction having oppositely struck out spring-carrying lugs, the outer section being provided with lateral rings, hooks set into the openings in the spring-carrying lugs and the outer rings, and springs engaging between the opposed hooks of the ring and spring-carrying lugs.

4. In a spring wheel, the combination of outer and inner wheel sections slidably arranged, the inner wheel section provided with a web construction having alternately offset spring-carrying lugs, the outer section being provided with side rings, hooks let into openings in the side rings and spring-carrying lugs, yokes engaged in the hooks, and compression springs engaging between the turned-over ends of the yoke legs and the hooks.

5. In a spring wheel, the combination of an inner wheel section provided with a web construction, an outer wheel section provided with side rings, springs engaging between the periphery of the web and the side rings, flexible rings *i* and *h* engaging about the web construction, and locking rings *l* and *k* adapted to engage between the flexible rings *i* and *h* and the side rings.

6. In a spring wheel, the combination of an inner section provided with a web construction, an outer section provided with side rings, springs engaging between the periphery of the web construction and the side rings, flexible rings *h* and *i* engaging between the side rings and the web construction, and locking rings *l* and *k* having a V-like cross section adapted to engage in between the flexible rings and the side rings.

7. In a spring wheel, the combination of an inner wheel provided with a web construction, an outer wheel provided with a rim and side rings, springs between the outer section and the periphery of the web construction, flexible rings *i* and $h_4$ engaging between the web construction and the side rings and having shoulders *m*, and locking rings *l* and *k* engaging between the shoulders and the side rings to lock the parts together.

8. In a spring wheel, the combination of an inner wheel section provided with a web construction, an outer wheel section provided with a rim having one or more detachable side rings whereby the web construction of the inner wheel section may be assembled into the outer wheel section with the two in slightly overlapping relation, and springs engaging between the side rings and the outer portion of the web construction where the same overlap for supporting the inner wheel section yieldingly in the outer wheel section, and flexible inwardly bowed rings engaging between the side rings and the web construction for sealing off the chamber containing said springs.

9. In a spring wheel, the combination of an inner wheel section comprising a web construction, an outer wheel section provided with side rings at least one of which is detachable to permit the assembly of the inner wheel section into the outer wheel section in slightly overlapping relation, springs engaging between the side rings and the web construction where the same overlap for yieldingly supporting the inner wheel section within the outer wheel section, and means including flexible inwardly bowed rings provided with flanges carrying packing slidably engaging the web and adapted to seal off a chamber defined in part by the said rim and side rings and containing the said springs.

10. In a spring wheel, the combination of an inner wheel provided with a web construction, an outer wheel section provided with side rings one of which is removable to permit the assembly of the web construction within the outer section in slightly overlapping relation, and springs engaging between the web construction and the side rings where the same overlap to yieldingly support the inner section in the outer section, and means for sealing off a chamber defined in part by the outer section and the side rings and containing the springs, said means crowded under strain between the outer section and inner wheel and including the flexible rings provided with turned-over flanges and a packing that lightly engages the web construction.

In testimony whereof I affix my signature.

PETER EISENBACH.